US 10,486,761 B2

(12) United States Patent
Sievers-Paulsen et al.

(10) Patent No.: US 10,486,761 B2
(45) Date of Patent: Nov. 26, 2019

(54) LUGGAGE CONTAINER FOR A MOTORBIKE HAVING INTEGRATED LUGGAGE SECURING

(71) Applicant: Bayerische Motoren Werke Aktiengesellschaft, Munich (DE)

(72) Inventors: Johann Sievers-Paulsen, Freising (DE); Peter Reinhart, Peissenberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/198,227

(22) Filed: Nov. 21, 2018

(65) Prior Publication Data

US 2019/0092411 A1 Mar. 28, 2019

Related U.S. Application Data

(63) Continuation of application No. PCT/EP2017/055678, filed on Mar. 10, 2017.

(30) Foreign Application Priority Data

May 25, 2016 (DE) .................... 10 2016 209 073

(51) Int. Cl.
*B62J 9/00* (2006.01)
(52) U.S. Cl.
CPC .................... *B62J 9/001* (2013.01)
(58) Field of Classification Search
CPC ... B60R 5/04; B60R 7/02; B60R 7/005; B60P 7/0876; B62J 9/001
See application file for complete search history.

(56) References Cited

U.S. PATENT DOCUMENTS 5,538,169 A 7/1996 Moore
6,345,944 B1 * 2/2002 Florence ............... B60P 7/0876
410/118
(Continued)

FOREIGN PATENT DOCUMENTS

DE 88 09 290 U1 10/1988
DE 101 30 098 A1 1/2002
(Continued)

OTHER PUBLICATIONS

International Search Report (PCT/ISA/210) issued in PCT Application No. PCT/EP2017/055678 dated May 10, 2017 with partial English translation (five (5) pages).
(Continued)

*Primary Examiner* — Corey N Skurdal
(74) *Attorney, Agent, or Firm* — Crowell & Moring LLP

(57) ABSTRACT

A luggage container for a motor vehicle, in particular a motorcycle or a vehicle similar to a motorcycle is provided. The luggage container includes a first container part which defines a storage volume for stowing luggage and has a container opening for loading and unloading the storage volume. The luggage container also includes a second container part for optionally closing the luggage container. The first container part has a net assembly in an edge region of the container opening, having a retaining net for at least partially closing the container opening. The net assembly is configured to permit adjustment of the retaining net between at least two positions, in order to vary a portion of the container opening closed by the retaining net.

10 Claims, 1 Drawing Sheet

(56) References Cited

U.S. PATENT DOCUMENTS

| | | | | |
|---|---|---|---|---|
| 6,971,827 | B1* | 12/2005 | Embach | B60P 7/0876 |
| | | | | 296/97.23 |
| 7,488,024 | B1* | 2/2009 | Medlar | B60R 5/04 |
| | | | | 296/37.14 |
| 9,950,672 | B1* | 4/2018 | Salazar Fabian | B60J 5/101 |
| 2002/0008397 | A1 | 1/2002 | Takahashi | |
| 2007/0205240 | A1 | 9/2007 | Castro et al. | |
| 2013/0121785 | A1* | 5/2013 | Coury | B60P 7/06 |
| | | | | 410/97 |
| 2014/0197000 | A1 | 7/2014 | Harrison | |
| 2015/0274232 | A1* | 10/2015 | Hamada | B62J 9/008 |
| | | | | 180/219 |
| 2019/0084483 | A1* | 3/2019 | Ito | B60R 5/04 |

FOREIGN PATENT DOCUMENTS

| | | |
|---|---|---|
| DE | 201 20 009 U1 | 4/2002 |
| FR | 2 809 690 A1 | 12/2001 |

OTHER PUBLICATIONS

German-language Written Opinion (PCT/ISA/237) issued in PCT Application No. PCT/EP2017/055678 dated Nov. 30, 2017 (four (4) pages).

German-language Office Action issued in counterpart German Application No. 10 2016 209 073.9 dated Jan. 4, 2017 with partial English translation (13 pages).

* cited by examiner

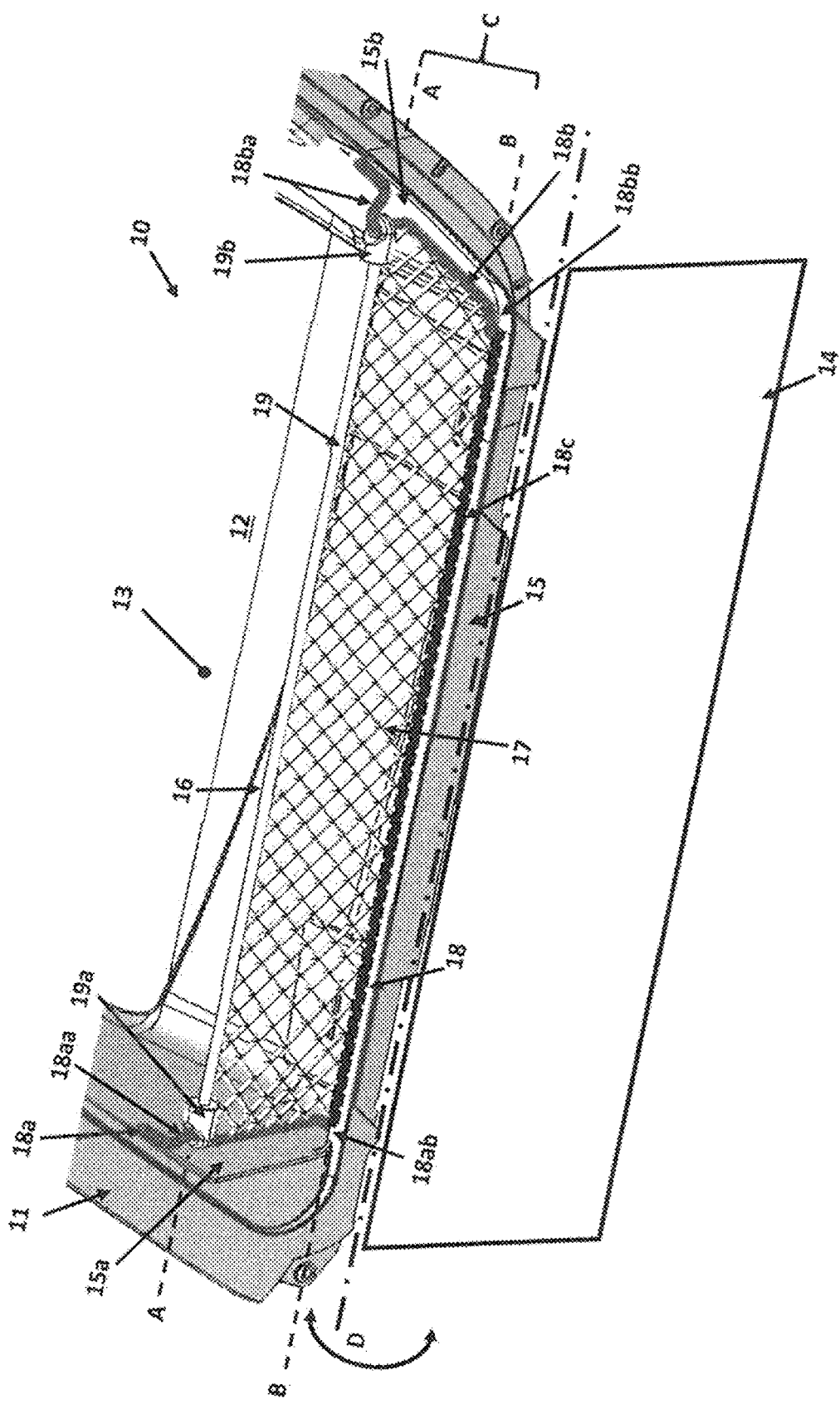

LUGGAGE CONTAINER FOR A MOTORBIKE HAVING INTEGRATED LUGGAGE SECURING

CROSS REFERENCE TO RELATED APPLICATIONS

This application is a continuation of PCT International Application No. PCT/EP2017/055678, filed Mar. 10, 2017, which claims priority under 35 U.S.C. § 119 from German Patent Application No. 10 2016 209 073.9, filed May 25, 2016, the entire disclosures of which are herein expressly incorporated by reference.

BACKGROUND AND SUMMARY OF THE INVENTION

The invention relates to a luggage container for a motor vehicle, in particular for a motorcycle or a motorcycle-like vehicle.

Luggage containers, such as cases or bags used on a motorcycle or a motorcycle-like vehicle, are subject to special requirements since the luggage containers are usually mounted on the vehicle and are loaded or unloaded by the user in this state. In the case of a luggage container which is attached laterally on a vehicle, in particular, additional retaining screens have been provided up to now in the storage space of a luggage container which is attached laterally on a vehicle, which additional retaining screens are intended to prevent objects from falling out for the case where the luggage container is opened. This is relevant, above all, in the case of those side cases and side bags which are not only arranged laterally on the vehicle, but rather are likewise opened laterally.

The known retaining screens are usually of rigid configuration and, in the mounted state, close at least part of the container opening which is utilized for loading and unloading. Therefore, although unintentional falling out of the luggage can be prevented, complete dismantling of the retaining screens is usually required for loading relatively large objects. A merely partial removal of the retaining screens is not possible.

It is therefore an object of the invention to provide a luggage container which provides reliable securing against luggage falling out and nevertheless makes easy to handle loading and unloading possible.

Accordingly, a luggage container for a motor vehicle, in particular a motorcycle or a motorcycle-like vehicle, is provided having:
 a first container part which defines a storage volume for stowing luggage and has a container opening for loading and unloading the storage volume, and
 a second container part for optionally closing the luggage container.

Moreover, the first container part has a net arrangement with a retaining net in an edge region of the container opening for at least partially closing the container opening. In addition, the net arrangement is configured for adjusting the retaining net between at least two positions, in order to vary a proportion of the container opening which is closed by way of the retaining net.

The luggage container therefore comprises a wall or a housing which is configured in at least two parts and comprises the first container part and the second container part. The first container part is provided, for example, for fastening to the vehicle and provides the storage volume which serves to receive the luggage. To this end, the first container part can be, for example, of shell-shaped configuration.

The second container part is provided for closing the luggage container and can be configured, for example, as a flat lid or likewise in a shell-shaped manner, in order to provide additional storage space. Easy opening and closing of the luggage container can be achieved by the second container part being connected to the first container part such that it can be moved, in particular can be folded or moved pivotably.

In order to prevent the luggage which is arranged in the storage volume of the first container part falling out in the open state of the luggage container, the net arrangement is provided which closes the container opening at least in sections with the aid of its retaining net. To this end, the retaining net can be stretched open in the region of the container opening, with the result that the luggage is retained within the storage volume. In order to additionally facilitate loading and unloading of the storage volume, the net arrangement is configured for adjusting the retaining net between the at least two positions. In this way, a proportion of the container opening which is closed by way of the retaining net can be varied and, depending on the requirement, the remaining open proportion of the container opening is therefore increased or decreased. As a consequence, no components, such as the known rigid retaining screens, need be dismantled or installed as required by the user with additional complexity.

If the retaining net is therefore situated in a first position, the first proportion which is closed by the retaining net can be, for example, greater than a second closed proportion which results when the retaining net is arranged in a second position. It goes without saying that said embodiments using two defined positions are merely of exemplary nature, and any desired number of positions or intermediate positions are fundamentally possible.

The retaining net is preferably configured as a textile net with a mesh size which can be selected as desired, or is configured as a textile woven fabric. Accordingly, the retaining net is flexible and can be folded and, as a result, can be stretched open or folded together easily. The retaining net is optionally of elastic configuration, with the result that an easy adaptation of the size in order to close proportions of the container opening of different size is possible.

Furthermore, the net arrangement can comprise two guide elements which are arranged in two sections of the edge region which are spaced apart from one another, in particular in sections of the edge region which lie opposite one another with regard to the container opening, the retaining net being configured so as to be displaceable along the guide elements. Here, the retaining net can be displaced in its entirety or merely in part. Displacing is also to be understood to mean, in particular, "pulling open" of a retaining net which was previously (at least partially) folded together or gathered up.

To this end, for example, the retaining net can be connected indirectly or directly to the first and second guide element.

For the case of the direct connection, this means that the retaining net can be in direct contact with the two guide elements and is guided and/or held by the guide elements during the adjustment. To this end, it is possible that the guide elements engage at a respective end of the retaining net (if present) into individual mesh openings, in order to produce the connection which nevertheless makes an adjustability of the retaining net possible. For example, the guide rails can be of wire-shaped, rod-shaped or rail-shaped configuration.

As an alternative or in addition, however, the retaining net can also be connected to the two guide elements by means of an indirect connection via an element which is arranged in between. This can be achieved by the element which is arranged in between being connected firstly to the retaining net and secondly in turn itself to the two guide elements.

In this case, the net arrangement can comprise, for example, an elastic tensioning element, in particular an elastic tensioning belt or an elastic cord, which is connected displaceably to the first guide element by way of a first end and is connected displaceably to the second guide element by way of a second end. In this way, the elastic tensioning element can be arranged between the two guide elements, preferably in a tensioned manner, and nevertheless can be capable of being displaced along the guide elements. The retaining net is preferably connected to the tensioning element by way of one of its ends, and can thus be adjusted into the at least two different positions by way of a displacement of the tensioning element.

Moreover, the elastic tensioning element affords the advantage that the net arrangement is flexible enough, in order to make loading or unloading possible even by way of simply pressing down the tensioning element, and in order to displace the retaining net (at least temporarily).

In order to fundamentally prevent an unintentional displacement of the tensioning element (and therefore also the retaining net), the two guide elements can in each case comprise a number of defined latching positions which are configured in each case for engaging one of the two ends of the elastic tensioning element. If the elastic tensioning element is under prestress, the ends can be held particularly securely at the desired position on account of their engagement into the latching positions and the resulting restoring force.

In addition, the net arrangement can comprise a connecting element which is arranged between the two guide elements, is connected to the edge region of the container opening, and connects the retaining net locally to the edge region. This means that the retaining net can be fixed on the edge region of the container opening by way of a further end by means of the connecting element. In this way, a displacement of the fixed end of the retaining net can be prevented. This is suitable in the installed state on the vehicle, in particular in a region of the luggage container which is close to the ground, in order to provide a reliable lower termination of the retaining net with respect to the edge region of the container opening and to prevent luggage falling out between the retaining net and the edge region.

In accordance with a further embodiment, the retaining net is connected at least to the connecting element and the elastic tensioning element. In this case, the retaining net can therefore be "stretched open" at least between said two elements, by the retaining net being fixed by way of a first end on one side in a stationary manner by way of the connecting element on the edge region and at an opposed second end on the elastic tensioning element, with the result that the retaining net can be adjusted into different positions along the two guide elements with the aid of the elastic tensioning element. In this way, it is possible to vary the closed proportion of the container opening by way of the adjustment and thus to change the size as required of the container opening which remains for loading and unloading. The size of the remaining container opening can also be enlarged in a rapid and uncomplicated manner on account of the particularly easy variability, and the size of the remaining container opening can subsequently be decreased again by way of an adjustment of the retaining net, in order to prevent anything falling out.

In accordance with a further embodiment, the net arrangement can comprise a substantially U-shaped guide bracket, the first guide element being defined by a first limb and the second guide element being defined by a second limb of the U-shaped guide bracket.

For example, the guide bracket can be produced from a bent rod made from plastic or metal, as a result of which particularly simple production is made possible. Here, the shape of the guide bracket can be adapted to a course of the edge region of the container opening and can follow said edge region substantially at least in sections. Accordingly, the U-shape of the guide bracket is to be understood in a correspondingly broad manner, for example also configured as a V-shape or in a substantially curved manner.

In addition, the connecting element can be defined by a center section of the U-shaped guide bracket, which center section connects the first limb and the second limb to one another. Accordingly, it is particularly simply possible to fasten the retaining net adjustably to the luggage container solely with the aid of the guide bracket, or preferably supplemented by way of the additional use of the elastic tensioning element.

In addition, the use of the U-shaped guide bracket allows the first and the second limb to in each case have indentations for providing the defined latching positions. This refinement affords the advantage that the indentations can be produced particularly simply and inexpensively by way of corresponding shaping of the guide bracket.

In accordance with one preferred embodiment, the luggage container is a side case or a side bag for a motorcycle or a motorcycle-like vehicle. A motorcycle-like vehicle is to be understood to mean, in particular, a motor scooter, for example a two-wheel, three-wheel or four-wheel motor scooter, a scooter, a trike, a quad or the like.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows an oblique view of an embodiment of the present invention.

DETAILED DESCRIPTION OF THE DRAWINGS

Said FIGURE shows a greatly simplified and merely partial illustration of a luggage container 10 which is configured as a side case or a side bag for a motor vehicle (not shown), in particular a motorcycle or a motorcycle-like vehicle, having a first shell-shaped container part 11 which defines a storage volume 12 for stowing luggage (not shown) and has a container opening 13 for loading and unloading the storage volume 12. A second container part 14 for optionally closing the luggage container 10 is merely indicated, which second container part 14 is connected to the first container part 11 such that it can be folded about a rotational axis D in the embodiment which is shown.

The first container part 11 has a net arrangement 16 with a retaining net 17 for at least partially closing the container opening 13 in a circumferential edge region 15 of the container opening 13. The net arrangement 16 is configured for adjusting the retaining net 17 between at least two positions A, B, in order to vary a proportion C of the container opening 13 which is closed by way of the retaining net 17.

To this end, the net arrangement 16 comprises two guide elements 18a, 18b which are arranged in two sections 15a, 15b of the edge region 15 which are spaced apart from one another (in the embodiment which is shown, in sections 15a, 15b of the edge section 15 which lie opposite one another with regard to the container opening 13), the retaining net 17 being configured so as to be displaceable along said guide elements 18a, 18b.

The retaining net 17 is connected directly to the first and second guide element 18a, 18b, by the two guide elements 18a, 18b extending through individual, outer mesh openings of the retaining net 17 and thus stretching the retaining net 17 open in the lateral direction. The mesh openings are freely movable along the guide elements 18a, 18b, with the result that the retaining net 17 can be adjusted accordingly.

In addition, the net arrangement 16 comprises an elastic tensioning element 19, in the form of an elastic cord which is connected displaceably to the first guide element 18a by way of a first end 19a and is connected displaceably to the second guide element 18b by way of a second end 19b.

The two guide elements 18a, 18b in each case have two defined latching positions 18aa, 18ab and 18ba, 18bb which are configured in each case for engaging one of the two ends 18a, 18b of the elastic tensioning element 19.

In addition, the net arrangement 16 comprises a connecting element 18c which is arranged between the two guide elements 18a, 18b, is connected to the edge region of the container opening 13, and connects the retaining net 17 locally to the edge region 15. The retaining net 17 is therefore connected, in addition to the connection to the two guide elements 18a, 18b, to the connecting element 18c and the elastic tensioning element 19, moreover, and is therefore also stretched open between said two elements when the tensioning element 19 is situated in the position A. In this case, said stretching open operation takes place in addition to the stretching open operation which has already been achieved by means of the two guide elements 18a, 18b and is directed substantially transversely with respect hereto, as a result of which the retaining net 17 can be stretched open flatly. If loading or unloading is to take place, the tensioning element 19 can be moved into the position B with its ends 19a, 19b, as a result of which the retaining net 17 is folded together and the proportion C of the container opening 13 which is closed by way of the retaining net 17 is reduced.

The embodiment which is shown has the special feature that the net arrangement 16 comprises a substantially U-shaped guide bracket 18, the first guide element 18a being defined by a first limb and the second guide element 18b being defined by a second limb of the U-shaped guide bracket 18. In addition, the connecting element 18c is also defined by a center section of the U-shaped guide bracket 18, which center section connects the first limb and the second limb to one another. This special refinement affords the option of easily producing and mounting the guide bracket 18 as a contiguous component. The first and the second limb can also in each case have indentations for providing the defined latching positions 18aa, 18ab, 18ba, 18bb.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A luggage container for a motorcycle or a motorscooter, comprising:
   a first container part having a storage volume and a container opening configured to permit loading and unloading of the storage volume;
   a second container part configured to cover the container opening to selectively close the luggage container; and
   a net arrangement having a retaining net, the net arrangement being configured to be located in an edge region of the container and cover a portion of an open side of the storage volume,
   wherein at least a portion of the retaining net is adjustable between at least two positions relative to the edge region of the container such that a size of the portion of the open side of the storage volume covered by the retaining net is variable.

2. The luggage container as claimed in claim 1, wherein the net arrangement includes two guide elements which are arranged in sections of the edge region spaced apart from one another, and
   the retaining net is displaceable along the guide elements.

3. The luggage container as claimed in claim 2, wherein the retaining net is connected indirectly or directly to the guide elements.

4. The luggage container as claimed in claim 3, wherein the net arrangement includes an elastic tensioning element connected displaceably at a first end to a first one of the two guide elements and at a second end to a second one of the two guide elements.

5. The luggage container as claimed in claim 4, wherein each of the guide elements includes at least two latching positions, and
   each of the latching positions of each guide element is configured to receive a respective one of the first and second ends of the elastic tensioning element.

6. The luggage container as claimed in claim 5, wherein the net arrangement includes a connecting element between the two guide elements,
   the connecting element is located at the edge region of the container opening, and
   the connecting element is configured to position an edge side of the retaining net at the edge region of the container opening.

7. The luggage container as claimed in claim 6, wherein the retaining net is connected at least to the connecting element and to the elastic tensioning element.

8. The luggage container as claimed in claim 7, wherein the first guide element, the second guide element and the connecting element are arranged as a U-shaped guide bracket with the connecting element between the first guide element and second guide element.

9. The luggage container as claimed in claim 8, wherein the connecting element is a center section of the U-shaped guide bracket and connects the first guide element and the second guide element to one another.

10. The luggage container as claimed in claim 1, wherein the luggage container is a side case or a side bag configured to be attached to a lateral side of the motorcycle or the motorscooter.

* * * * *